US011460808B2

(12) United States Patent
Zschau et al.

(10) Patent No.: US 11,460,808 B2
(45) Date of Patent: *Oct. 4, 2022

(54) METHOD FOR GENERATING A HEAD UP DISPLAY FOR AN AIRCRAFT USING VIDEO HOLOGRAMS IN REAL TIME WITH THE HELP OF SUB-HOLOGRAMS

(71) Applicant: SEEREAL TECHNOLOGIES S.A., Munsbach (LU)

(72) Inventors: Enrico Zschau, Dresden (DE); Armin Schwerdtner, Dresden (DE); Bo Kroll, London (GB); Alexander Schwerdtner, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 184 days.

This patent is subject to a terminal disclaimer.

(21) Appl. No.: 16/895,108

(22) Filed: Jun. 8, 2020

(65) Prior Publication Data

US 2020/0301362 A1 Sep. 24, 2020

Related U.S. Application Data

(63) Continuation of application No. 15/978,916, filed on May 14, 2018, now Pat. No. 10,678,188, which is a (Continued)

(30) Foreign Application Priority Data

Sep. 1, 2006 (DE) ..................... 10 2006 042 323.2
Sep. 1, 2006 (DE) ..................... 10 2006 042 326.7
(Continued)

(51) Int. Cl.
G03H 1/08 (2006.01)
G03H 1/22 (2006.01)

(52) U.S. Cl.
CPC ......... *G03H 1/2294* (2013.01); *G03H 1/0808* (2013.01); *G03H 2001/0833* (2013.01);
(Continued)

(58) Field of Classification Search
CPC .............. G03H 1/2294; G03H 1/0808; G03H 2001/0833; G03H 2210/30; G03H 2210/452; G03H 2226/05
(Continued)

(56) References Cited

U.S. PATENT DOCUMENTS 5,760,931 A 6/1998 Saburi et al.
6,753,990 B1 6/2004 Payne et al.
(Continued)

FOREIGN PATENT DOCUMENTS

DE 102006004300 A1 8/2007
WO 0239192 A1 5/2002
(Continued)

OTHER PUBLICATIONS

Lucente, M., "Computational holographic bandwidth compression", IBM System Journal, IBM Corp., vol. 35, No. 3/4, pp. 349-365 (1996) XP000635081.

Primary Examiner — Audrey Y Chang
(74) Attorney, Agent, or Firm — Saul Ewing Arnstein & Lehr LLP

(57) ABSTRACT

A method for generating video holograms in real time for a holographic playback device comprising at least one light modulator means, into which a scene divided into object points is encoded as an entire hologram and can be seen as a reconstruction from a visibility region, which is located within a periodicity interval of the reconstruction of the video hologram, the visibility region defining a subhologram together with each object point of the scene to be reconstructed, and the entire hologram being generated from a
(Continued)

superposition of contributions of subholograms, is characterized in that for each object point the contributions of the subholograms in the entire reconstruction of the scene can be determined from at least one look-up table.

17 Claims, 3 Drawing Sheets

Related U.S. Application Data continuation of application No. 12/439,271, filed as application No. PCT/EP2007/059111 on Aug. 31, 2007, now abandoned.

(30) Foreign Application Priority Data

Sep. 1, 2006 (DE) ............... 10 2006 042 613.4
Sep. 1, 2006 (DE) ............... 10 2006 042324.0

(52) U.S. Cl.
CPC ... *G03H 2210/30* (2013.01); *G03H 2210/452* (2013.01); *G03H 2226/05* (2013.01)

(58) Field of Classification Search
USPC .............................................. 359/9
See application file for complete search history.

(56) References Cited

U.S. PATENT DOCUMENTS

| | | | |
|---|---|---|---|
| 7,230,746 B2 | 6/2007 | Cameron et al. | |
| 8,218,210 B2 | 7/2012 | Gitter | |
| 8,325,401 B2 | 12/2012 | Schwerdtner et al. | |
| 10,678,188 B2 * | 6/2020 | Zschau | G03H 1/0808 |
| 2005/0286101 A1 | 12/2005 | Garner et al. | |
| 2010/0033780 A1 | 2/2010 | Gitter | |
| 2010/0067075 A1 | 3/2010 | Schwerdtner | |
| 2010/0149312 A1 | 6/2010 | Schwerdtner | |
| 2010/0149609 A1 | 6/2010 | Schwerdtner | |

FOREIGN PATENT DOCUMENTS

| | | |
|---|---|---|
| WO | 2004044659 A2 | 5/2004 |
| WO | 2006027228 A1 | 3/2006 |
| WO | 2006066906 A1 | 6/2006 |
| WO | 2006066919 A1 | 6/2006 |
| WO | 2006119760 A2 | 11/2006 |

* cited by examiner

METHOD FOR GENERATING A HEAD UP DISPLAY FOR AN AIRCRAFT USING VIDEO HOLOGRAMS IN REAL TIME WITH THE HELP OF SUB-HOLOGRAMS

CROSS-REFERENCE TO RELATED APPLICATIONS

This application is a continuation of U.S. application Ser. No. 15/978,916, filed on May 14, 2018, which is a continuation of U.S. application Ser. No. 12/439,271, filed on Oct. 30, 2009, which is the U.S. national phase of International Application No. PCT/EP2007/059111, filed on Aug. 31, 2007, which claims priority to German Application Nos. DE 10 2006 042 613.4, filed on Sep. 1, 2006; DE 10 2006 042 323.2, filed on Sep. 1, 2006; DE 10 2006 042 326.7, filed on Sep. 1, 2006; and DE 10 2006 042324.0, filed on Sep. 1, 2006, the entire contents of each of which being fully incorporated herein by reference.

BACKGROUND OF THE INVENTION

The invention relates to a method for generating video holograms, in particular computer-generated video holograms (CGVH), from image data with depth information in real time. During the holographic reconstruction of the three-dimensional objects or three-dimensional scenes, the light wave front is generated through interference and superimposition of coherent light waves.

In contrast to classic holograms, which are stored photographically or in another suitable way in the form of interference patterns, video holograms exist as a result of the computation of hologram data from sequences of a three-dimensional scene and of their storage with electronic means.

In a holographic display device, modulated light which is capable of generating interference propagates in the space in front of the eyes of an observer in the form of a light wave front which is controllable through amplitude and/or phase values, said light wave front thereby reconstructing a three-dimensional scene. Controlling a light modulator means with the hologram values of the video holograms causes the emitted wave field, which has been modulated in its pixels, to reconstruct the desired three-dimensional scene in the space by creating interferences.

A holographic display device typically comprises an arrangement of controllable pixels which reconstruct object points by electronically influencing the amplitude and/or phase of illuminating light. In this document, the term 'pixel' denotes a controllable hologram pixel in the light modulator means; a pixel is individually addressed and controlled by a discrete value of a hologram point. Each pixel represents a hologram point of the video hologram. In an LCD, the term 'pixel' is therefore used for the individually addressable image points of the display screen. In a Digital Light Processing display (DLP), the term 'pixel' is used for an individual micro-mirror or a small group of micro-mirrors. In a continuous SLM, a 'pixel' is the transitional region on the light modulator means which represents a complex hologram point. The term 'pixel' thus generally denotes the smallest unit which represents or which is able to display a complex hologram point.

Many types of light modulator means are known, for example in the form of a spatial light modulator (SLM). The light modulator means can be of a continuous type or of a matrix type. For example, it may be a continuous SLM with a matrix control or an acousto-optic modulator (AOM). A liquid crystal display (LCD) serves as an example of such a suitable display device for the reconstruction of video holograms by way of amplitude modulation of a light pattern. However, this invention can also be applied to other controllable devices which use coherent light for modulating a light wave front.

A holographic display device which is preferably used for the present invention is substantially based on the following principle: A scene which is divided into object points is encoded as a total hologram on at least one light modulator means. The scene can be seen as a reconstruction from a visibility region which lies within one periodicity interval of the reconstruction of the video hologram. A sub-hologram is defined for each object point of the scene to be reconstructed. The total hologram is formed by a superimposition of sub-holograms. In general, the principle is to reconstruct mainly that wave front that would be emitted by an object into one or multiple visibility regions. The reconstruction of a single object point only requires a sub-hologram as a subset of the total hologram which is encoded on the light modulator means. The holographic display device comprises at least one screen means. The screen means is either the light modulator itself where the hologram of a scene is encoded, or an optical element—such as a lens or a mirror—on to which a hologram or wave front of a scene encoded on the light modulator is projected.

The definition of the screen means and the corresponding principles for the reconstruction of the scene in the visibility region are described in other documents filed by the applicant. In documents WO 2004/044659 and WO 2006/027228, the screen means is the light modulator itself. In document WO 2006/119760, "Projection device and method for holographic reconstruction of scenes", the screen means is an optical element on to which a hologram which is encoded on the light modulator is projected. In document DE 10 2006 004 300, "Projection device for the holographic reconstruction of scenes", the screen means is an optical element on to which a wave front of the scene encoded on the light modulator is projected.

The visibility region is a confined region through which the observer can watch the entire reconstructed scene. Within the visibility region, the wave fields interfere to form a wave front such that the reconstructed scene becomes visible for the observer. The visibility region is located on or near the eyes of the observer. The visibility region can be moved in the directions X, Y and Z and is tracked to the actual observer position with the help of known position detection and tracking systems. It is possible to use two visibility regions for each observer, one for each eye. Generally, other embodiments of visibility regions are also possible. It is further possible to encode video holograms such that for the observer individual objects or the entire scene seemingly lie behind the light modulator.

A virtual, frustum-shaped reconstruction space stretches between the light modulator means of the holographic display device and the visibility region, where the light modulator represents the base and the visibility region the top of the frustum. If the visibility regions are very small, the frustum can be approximated as a pyramid. The observer looks through the visibility region towards the holographic display device and receives in the visibility region the wave front which represents the scene.

Document WO/2006/066906 filed by the applicant describes a method for computing video holograms. It generally includes the steps of slicing the scene into section planes which are parallel to the plane of a light modulator, transforming all those section planes into a visibility region and adding them up there. Then, the added results are back-transformed into the hologram plane, where also the light modulator is disposed, thus determining the complex hologram values of the video hologram.

This method substantially carries out the following steps, aided by a computer, for a three-dimensional scene:

a diffraction image is computed in the form of a separate two-dimensional distribution of wave fields for an observer plane, which is situated at a finite distance and parallel to the section planes, from each object data set of each tomographic scene section, where the wave fields of all sections are computed for at least one common visibility region, the computed distributions of all section planes are added so as to define an aggregated wave field for the visibility region in a data set which is referenced in relation to the observer plane, and the reference data set for generating a hologram data set for a common computer-generated hologram of the scene, is transformed into a hologram plane, which is situated at a finite distance and parallel to the reference plane, where the light modulator means lies in the hologram plane.

The generation of the complex hologram values according to document WO/2006/066906 is very complex. Due to the large number of necessary transformations, the implementation of this method causes great computational loads.

Real-time encoding or generation of the hologram values would require costly high-performance computing units. Such expensive computing units would limit or impair the acceptance of digital video holography.

SUMMARY OF THE INVENTION

It is thus the object of the present invention to provide a method for generating video holograms from three-dimensional image data with depth information in real time. It shall be possible to generate these holograms using simple and inexpensive computing units.

The object is solved by a method where for all object points the contributions of the sub-holograms to the entire reconstruction of the scene can be retrieved from at least one look-up table. These sub-holograms are superimposed so as to form a total hologram for reconstructing the entire scene.

The method according to this invention is suitable for holographic display devices as defined in the preamble of claim 1. Such a holographic display device with adequate light modulator means is therein based on the principle to superimpose the wave fields which are modulated with the information of object points of a scene in at least one visibility region. A single object point is created by one sub-hologram, whose position depends on the position of the object point and whose region or size depends on the observer position. The region of the sub-hologram includes those pixels on the light modulator means which must be addressed in order to reconstruct the respective object point. The region of the sub-hologram thus only represents a sub-region of the light modulator means.

According to a most simple embodiment, the centre of the sub-hologram is situated on the straight line through the object point to be reconstructed and through the centre of the visibility region. Further, in a most simple embodiment, the size of the sub-hologram is determined based on the theorem of intersecting lines, where the visibility region is traced through the object point to be reconstructed back to the light modulator means. The size of the visibility region thus changes depending on the normal distance between the observer and the light modulator means.

Given a constant normal distance of the observer, it must be distinguished whether or not the object points are encoded at a fixed position. If the object points are not encoded at a fixed position, the positions of the sub-holograms are determined as if the observer was situated in the middle, e.g. centrally in front of the light modulator, independent of where he is really situated—given a constant normal distance to the light modulator means. If the observer moves, the reconstructed object point lies on the straight line which connects the centre of the current visibility region and the centre of the sub-hologram which is related to the centre.

If the object point is encoded at a fixed position, this means that the spatial position of the reconstructed object point remains unchanged in relation to the light modulator means. The normal distance of the object point from the light modulator means also remains unchanged. In order to achieve this, the position of the sub-hologram in relation to the light modulator means is changed depending on the observer position. Here again, the position of the sub-hologram is determined such that the centre of the sub-hologram lies on the straight line through the object point to be reconstructed and through the centre of the visibility region. If the observer moves, this straight line has the object point to be reconstructed as a pivotal point, which means that the position of the sub-hologram depends on the observer position.

A particularly preferred embodiment of the method is described below: In a preparatory process step, the visible object points are determined. Prepared data can already be taken over from an interface. The inventive method comprises the following steps:

finding the position and size of the sub-hologram for each object point, as described above;

determination of the contributions of the corresponding sub-hologram from at least one look-up table;

repetition of these two steps for all object points, where the sub-holograms are superimposed so as to form a total hologram for the reconstruction of the entire scene. The individual sub-holograms of the object points are superposable and are added using complex number addition so as to form the total hologram, considering a global coordinate system.

The look-up table comprises the complex values of the sub-holograms and thus the contribution of the object point to the total hologram. The look-up table is structured such as to allow fast access to the data. A look-up table can be implemented in any kind of memory sections or interfaces which provide the contributions to the sub-holograms. Examples are dedicated memory sections, data carriers, databases or other storage media and interfaces. Preferred interfaces are the Internet, WLAN, Ethernet and other local and global networks.

According to a further aspect of the invention, additional correction functions are applied to the sub-holograms or to the total hologram, e.g. in order to compensate tolerances of the light modulator means caused by its position or shape, or to improve the reconstruction quality. The correction values are for example added to the data values of the sub-holograms and/or of the total hologram.

The principle of using look-up tables can preferably be extended. For example, parameter data for colour and brightness information can be stored in separate look-up tables. In addition, data values of the sub-holograms and/or the total hologram can be modulated with brightness and/or colour values retrieved from look-up tables. For a colour representation, it is also possible that the hologram values of individual colours can be retrieved from respective look-up tables.

The look-up tables are generated by determining the hologram values of the sub-hologram for each possible object point in a defined space, and by storing them in suitable data carriers and/or storage media or by providing them through interfaces. The space comprises for example the intended range of motion of the observer in which he can see the hologram. For an object point, for example, the hologram values of the corresponding sub-holograms are generated by propagating the wave front which is emitted by the object point into the visibility region and back-transforming it into the hologram plane where also the light modulator means is situated. According to document WO/2006/066906, each of the hologram values are generated for a single object point, for example.

According to another proposed solution, the hologram values are generated with the help of the ray tracing method. Further proposed solutions comprise analytic methods, or optimisation methods. Approximation methods are also possible.

The inventive method thus accesses those data for each object point to be reconstructed. Those data can be processed further at an accordingly fast pace. The generation of the hologram values in real time can thus be substantiated by the inventive method.

In summary, it can be said that the previously very high and costly demands made on the computing unit for generating the holographic data can be reduced substantially with the help of the inventive method. The computational load can be reduced by orders of magnitude when using the look-up tables. The inventive method thus allows the generation of holograms to be carried out interactively and in real time using common PC systems. Finally, thanks to the reliable generation of the holograms in real time, it is ensured that the resulting undesired delay for tracking the observer pupils can be reduced. The generation of the holograms for a single observer is thus also ensured for simple computing units in real time. The inventive method also allows temporally or spatially separated holograms to be provided in real time so as to serve multiple observers.

Because the generation of the holograms requires only little computational load, the computation may for example not be carried out by the central processing unit CPU of a computer. According to an alternative solution, the holograms are generated using the components of the graphics card, where preferably a graphics central processing unit (GPU) and/or specially configured computing units are used. This also allows increased data transfer rates to be used preferably.

BRIEF DESCRIPTION OF THE DRAWINGS

The present invention is described in more detail below with the help of an embodiment and with reference to the drawings, wherein.

DETAILED DESCRIPTION OF THE INVENTION

Figure 1A:
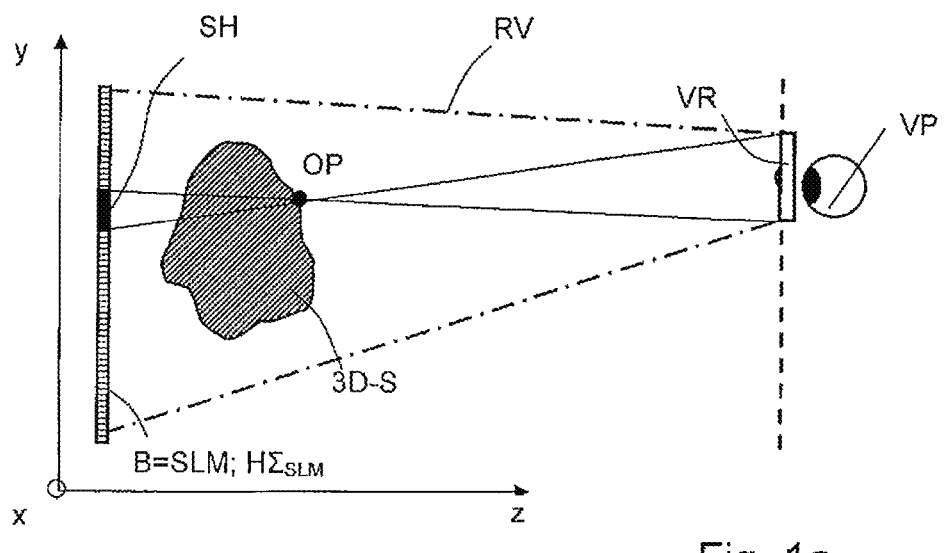
FIGS. 1a and 1b are schematic two-dimensional diagrams, each showing a holographic display device.

FIG. 1a illustrates the general principle on which a holographic display device (HAE) for one observer is based. The principle applies accordingly to multiple observers. The position of an observer is characterised by the position of his eyes or his pupils (VP). The device comprises a light modulator means (SLM), which is identical to the screen means (B) in this embodiment in order to keep things simple, and it superimposes the wave fields which are modulated with information of object points of a scene (3D-S) in at least one visibility region (VR). The visibility region is tracked to the eyes. A reconstruction space (RV) stretches between the light modulator means (SLM) and the visibility region (VR). The reconstruction of a single object point (OP) of a scene (3D-S) only requires one sub-hologram (SH) as a subset of the total hologram (HΣSLM) encoded on light modulator means (SLM). As can be seen in this figure, the region of the sub-hologram (SH) only comprises a small subsection of the light modulator means (SLM). According to a most simple embodiment, the centre of the sub-hologram (SH) lies on the straight line through the object point (OP) to be reconstructed and through the centre of the visibility region (VR). In a most simple embodiment, the size of the sub-hologram (SH) is determined based on the theorem of intersecting lines, where the visibility region (VR) is traced through the object point (OP) to be reconstructed back to the light modulator means (SLM). The position and size of the sub-hologram defines the indices of those pixels on the light modulator means (SLM) which are required for reconstructing this object point and which must be addressed.

Figure 1B:
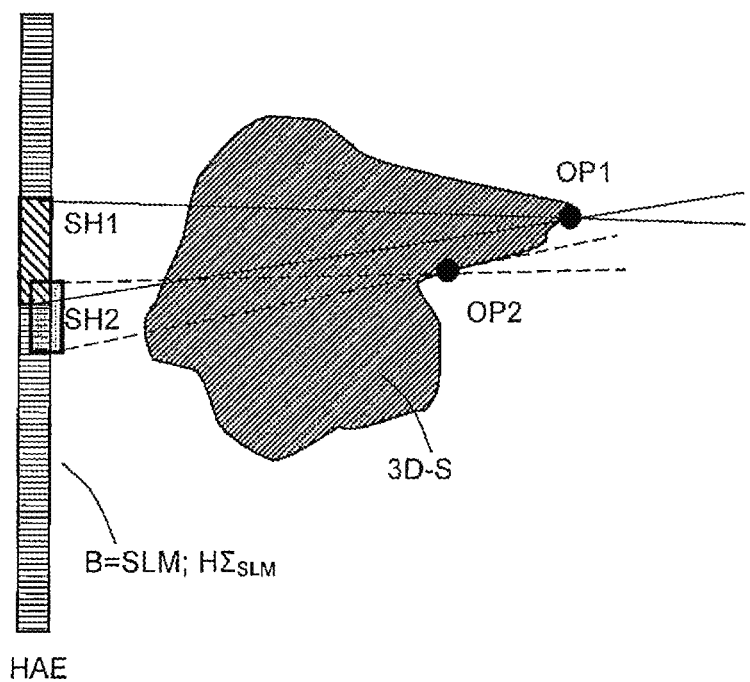

FIG. 1b illustrates this principle in more detail and shows an enlarged detail of the holographic display device (HAE) with the sub-holograms (SH1, SH2), which relate to the object points (OP1, OP2), respectively. It can be seen in FIG. 1b that these sub-holograms are confined and form a small and contiguous subset of the total hologram (HΣSLM), i.e. of the entire light modulator means (SLM). In addition to the position and size of the sub-holograms, which are determined based on the theorem of intersecting lines, further functional relations are possible.

Figure 2:
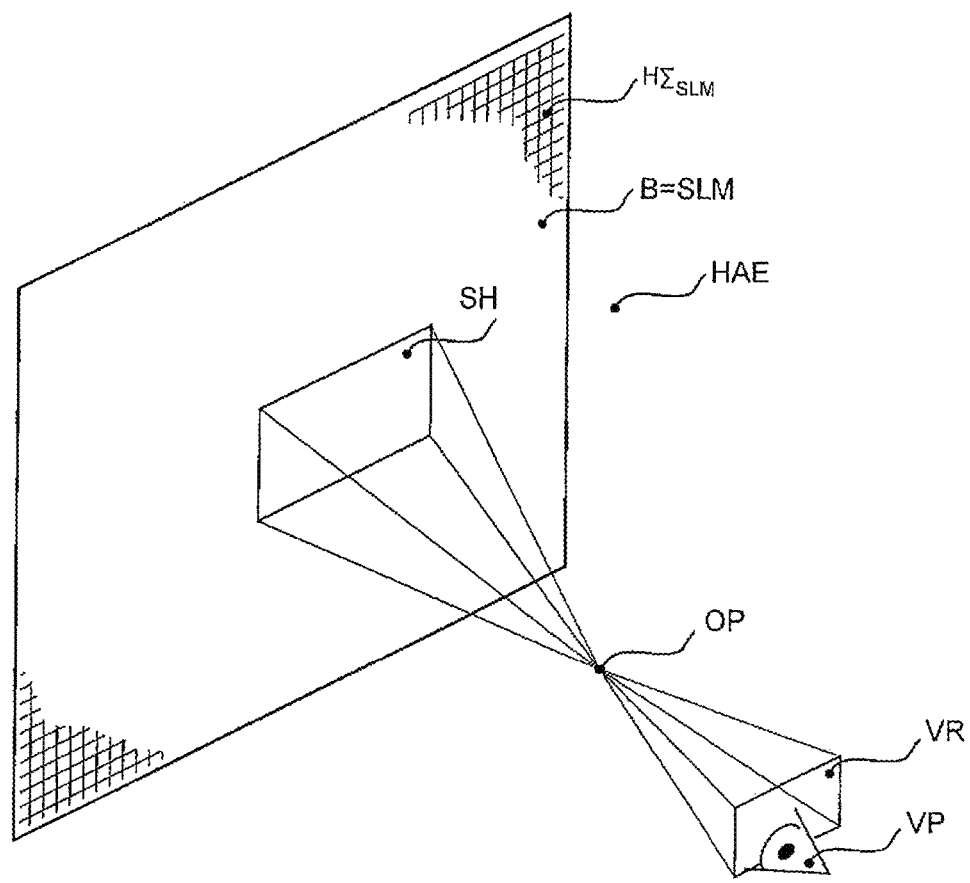
FIG. 2 is a perspective view illustrating the principle of a holographic display device.

FIG. 2 shows the principle of the sub-holograms (SH) in a perspective view, where like elements are denoted by like reference numerals.

Figure 3:
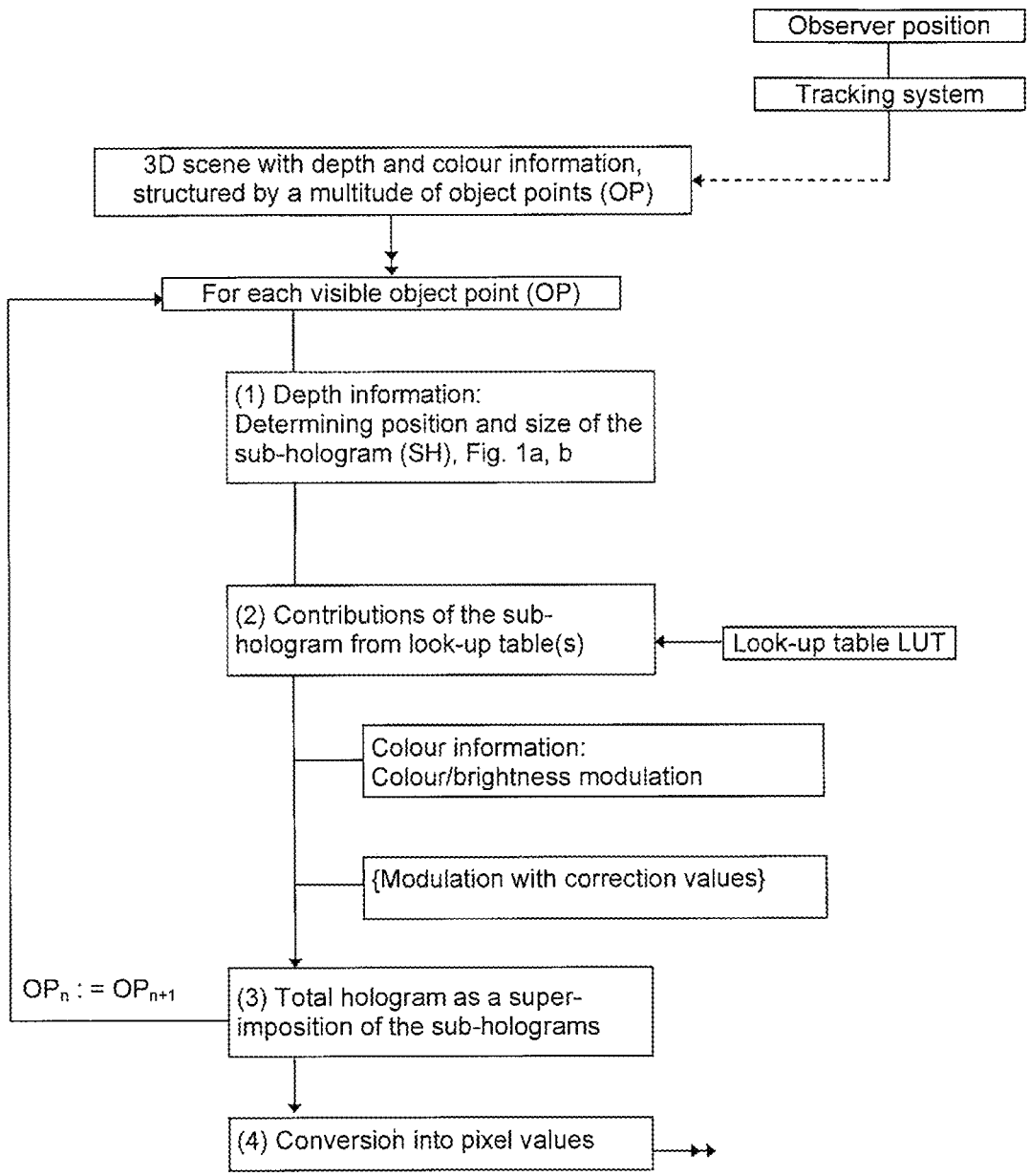
FIG. 3 shows a flowchart of the inventive method according to an embodiment.

FIG. 3 shows a flowchart of the inventive method according to an embodiment. This embodiment is based on a three-dimensional scene (3D-S) which is composed of a multitude of object points (OP). Colour and depth maps are available for the object points (OP). The so-called depth map comprises the depth information and the so-called colour map comprises the colour information of pixelated images, which are provided by a graphics system.

In a step (1), the size and position of the respective sub-hologram (SH) in the hologram plane, or on the light modulator means (SLM), is determined for each visible object point. This is carried out according to the above-mentioned principles with the help of the depth information of the object point and the observer position (VP).

In a step (2), the complex hologram values of the sub-hologram (SH) are determined with the help of at least one look-up table, following the general idea of the present invention. For example, these data are retrieved from dedicated memory sections of a graphics system. Moreover, the complex values of the sub-hologram are modulated with colour and brightness values according to the colour and/or brightness of the object point in order to modify the amplitudes of the hologram values, if necessary. For example, the complex contributions of the sub-hologram are multiplied with an intensity factor. The colour map comprises the colour information and is preferably read through a separate interface. It is possible to determine the colour related contributions of the sub-holograms from at least one look-up table. For the colour representation it is further possible to retrieve the correction values for the colour information from look-up tables and to modulate the contributions of the sub-hologram with these values.

The data in the above-mentioned look-up tables are generated in advance. The data are preferably generated for each single object point using the method described in WO/2006/066906, as cited in the prior art section above, and stored in suitable data carriers and storage media. With the help of the position and properties of the object points, the corresponding sub-holograms are computed in advance and the look-up tables of the sub-holograms, and if necessary of the colour and brightness values and the correction parameters, are thus generated.

In a step (3), the sub-holograms of the object points are added so as to form a total hologram (HΣSLM). The individual sub-holograms (SH1, SH2, . . . ) of the object points are superposable and are added using complex number addition so as to form the total hologram (HΣSLM), considering a global coordinate system. The total hologram (HΣSLM) represents the hologram of all object points. The total hologram thus represents and reconstructs the entire scene (3D-S). The sub-holograms can alternatively be superimposed in a separate step. In a final step (4), as already explained above, the hologram values can be encoded into Burckhardt components, two-phases components or any other suitable code in order to transform the total hologram into pixel values for the holographic display device, preferably according to WO 2004/044659, WO 2006/027228, WO 2006119760 and DE 10 2006 004 300.

We claim:

1. A method for generating image information representing two-dimensional information or three-dimensional information in real time, the method comprising the steps of:
dividing a scene into object points,
where the scene is observable as a reconstruction from a visibility region which is located at an eye of an observer,
determining a position of the visibility region where the eye of the observer is located by a detection and tracking system,
where position and size of a sub-hologram depend on the determined position of the visibility region and on a position of one of the object points of the scene;
where for a pre-defined normal distance of the observer from at least one light modulator, object points are either encoded at a fixed position or not at a fixed position in relation to the at least one light modulator,
where the position of the sub-hologram is determined such that a centre of the sub-hologram lies on a straight line through the object point to be reconstructed and a centre of the visibility region,
where contributions of hologram values of the sub-holograms to hologram values of an entire hologram representing the scene are retrievable from at least one look-up table for said object points and where the look-up table comprises the hologram values of the sub-holograms;
forming the hologram values of the entire hologram using a mathematical superimposition of contributions of hologram values of the sub-holograms; and
encoding the hologram values of an entire hologram in the at least one light modulator means, where the entire hologram represents the scene.

2. The method according to claim 1 where the position and viewing direction of an observer define a view of the scene and where the observer is assigned with at least one visibility region, which lies near the eyes in an observer plane, where the scene to be reconstructed is three-dimensionally decomposed into visible object points and which comprises the following process steps:
finding the position and size of the sub-hologram for each visible object point,
determination of the contributions of the corresponding sub-hologram from at least one look-up table,
repetition of these two steps for all object points, where the hologram values of the sub-holograms are mathematically superimposed so to form an entire hologram for the reconstruction of the entire scene.

3. The method according to claim 1 where at least one of hologram values of the sub-holograms and the entire hologram are modulated with brightness values or where at least one of hologram values of the sub-holograms and the entire hologram are modulated with colour values.

4. The method according to claim 3 where at least one of hologram values of the sub-holograms and the entire hologram are modulated with brightness values from at least one look-up table or where at least one of hologram values of the sub-holograms and the entire hologram are modulated with colour values from at least one look-up table.

5. The method according to claim 1 where correction values for at least one of the following are added to the hologram values of the sub-holograms and/or the entire hologram: compensating tolerances of the light modulator means caused by its position or shape, improvement of a reconstruction quality, and for correction of colour information.

6. The method according to claim 1 where the size of the sub-hologram is determined by tracing back the visibility region through the object point to the light modulator means.

7. The method according to claim 1 where for colour representation the hologram values of the sub-holograms for primary colours can be retrieved from respective look-up tables.

8. The method according to claim 1 where hologram values are converted into pixel values of the light modulator means.

9. The method according to claim 8 where the hologram values are converted into Burckhardt components or components for a two-phase encoding.

10. The method according to claim 1 for a holographic display device with a screen means, where the screen means is an optical element on to which a hologram or wave front of the scene encoded on the light modulator means is projected.

11. The method according to claim 10 where the optical element of the display device is a lens or mirror.

12. The method according to claim 1 where the hologram values of the sub-hologram of an object point are determined by computationally propagating the wave front which is emitted by the object point into the visibility region.

13. The method according to claim 1 where the look-up table is generated by determining the hologram values of the sub-hologram for each possible object point in a defined space by computationally propagating the wave front which is emitted by the object point into the visibility region and by performing a mathematical back-transformation of the wave front from the visibility region into the hologram plane where the light modulator means is situated.

14. The method according to claim 1 where the look-up table is generated by determining the hologram values of the sub-hologram for each possible object point in a defined space with the help of optimisation or approximation methods.

15. The method according to claim 1 comprising the step of encoding video holograms such that for the observer individual objects or the entire scene seemingly lie behind the light modulator.

16. The method according to claim 1 where if the object points are not encoded at a fixed position, the positions of the sub-holograms are determined as if the observer was situated in the middle in front of the light modulator, independent of where he is really situated.

17. A holographic display device comprising at least one light modulator means, wherein the holographic display device is adapted to carry out the method according to claim 1.

* * * * *